Figure 1:
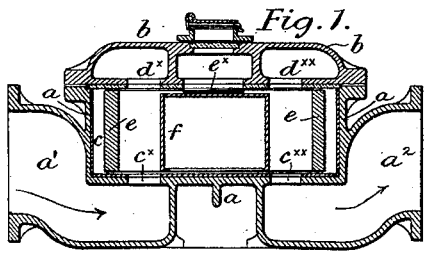

(No Model.)

W. G. KENT.
ROTARY WATER METER.

No. 429,923. Patented June 10, 1890.

Witnesses
Baltus DeLong.
N. H. Smith.

Inventor
Walter George Kent.
By his attys.
Baldwin, Davidson & Wight.

UNITED STATES PATENT OFFICE.

WALTER GEORGE KENT, OF LONDON, ENGLAND.

ROTARY WATER-METER.

SPECIFICATION forming part of Letters Patent No. 429,923, dated June 10, 1890.

Application filed September 14, 1889. Serial No. 323,944. (No model.)

*To all whom it may concern:*

Be it known that I, WALTER GEORGE KENT, a subject of the Queen of Great Britain, residing at 199, 200, and 201 High Holborn, London, in the county of Middlesex, England, have invented certain new and useful Improvements in Water-Meters, of which the following is a specification.

This invention has for its object improvements in water-meters.

I construct a water-meter with one part adapted to be connected with the supply-pipe on the one side and with the delivery-pipe on the other side, and with another part constituting a cover fixed upon the first part by bolts or otherwise. The measuring part of the meter is formed in the first-mentioned part, and consists of a chamber of cylindrical form as to about two-thirds of its circumference with an enlargement as to the remaining portion. It is closed at the ends, and the water to be measured enters it by an aperture in one of its ends and passes out by another aperture therein. The measuring-chamber contains a cylindrical boss, which is able to rotate about a stud eccentrically placed within the chamber. The boss is contained in a cavity in an oval piston or partition, which both rotates with or about and slides longitudinally upon the boss, one or other of its ends meanwhile being always in contact with the walls of the measuring-chamber. This piston, with the aid of an abutment or flap, which is connected by a hinged or flexible joint with a projection from the wall of the chamber, serves at all times to separate the inlet from the outlet aperture of the measuring-chamber, but the water is able to pass in consequence of the revolution of the piston within the chamber. Arrangements are made to regulate the amount of play allowed to the abutment and to compensate for wear. The cavity in the piston is divided into two parts by the boss within it, and one part overlaps the inlet-aperture and the other the outlet. Consequently the water-pressure within the piston tends to keep its leading end in contact with the wall of the measuring-chamber. In order that the water-pressure may not force the piston against the upper end of the measuring-chamber double apertures are formed—that is to say, there is an inlet-aperture and also, an exit-aperture at each end of the measuring-chamber. These extra apertures are connected with the main passages by channels at the side of the measuring-chamber. They both facilitate the flow through the meter and they serve to equalize the action of the water upon the two faces of the piston. Upon the upper face of the piston there is an arm, and this, as the piston rotates, drives counting mechanism mounted upon the cover. On either side of the abutment, ribs are provided to guide the end of the piston as it approaches and leaves the abutment. These guide-ribs are formed in one piece, and this piece serves also to carry the abutment. The piece is arranged so that it can be adjusted to compensate wear. To provide freer ingress and egress for the water when the end of the piston is near to the abutment, apertures are formed at the side of the measuring-chamber between the guide-ribs. These apertures connect the measuring-chamber directly with the side channels previously mentioned. I make the piston of vulcanite, and to impart the requisite strength and rigidity I sometimes cause wire or metal rings or strips to be embedded in the vulcanite in the process of manufacture.

In order that my said invention may be fully understood and readily carried into effect, I will proceed to describe the drawings hereunto annexed.

Figure 2:
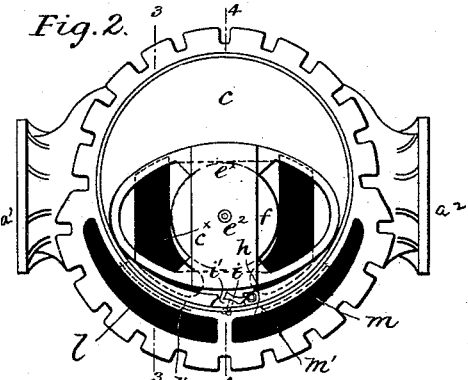
Figure 3:
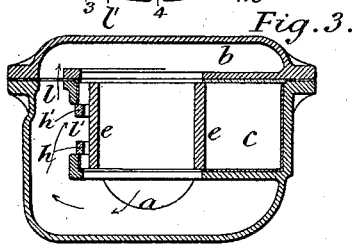
Figure 4:
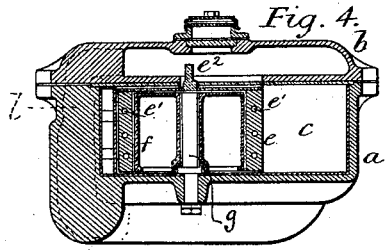
Figure 5:
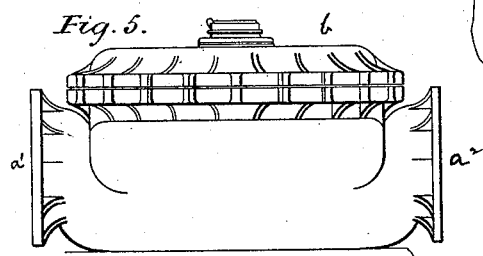
Figure 6:
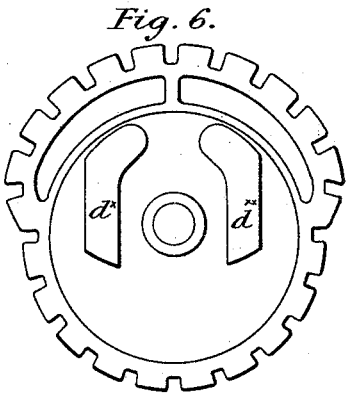
Figure 7:
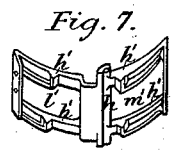
Figure 8:
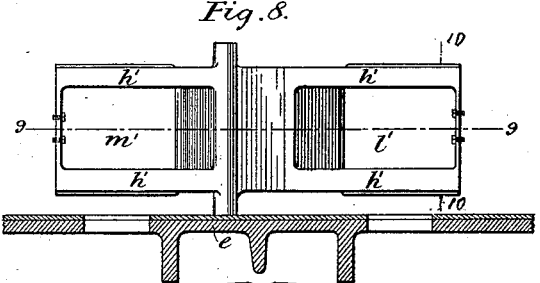
Figure 9:
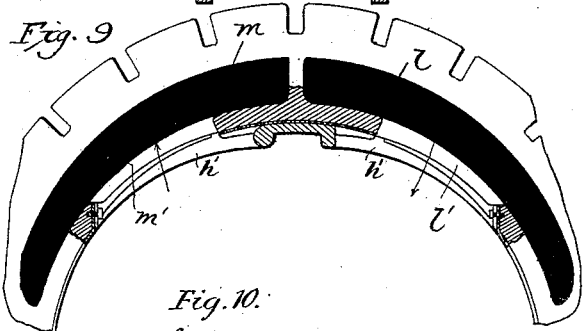
Figures 10, 11:
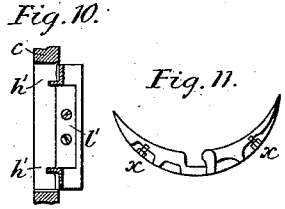

Figure 1 is a longitudinal and vertical section of a meter constructed in accordance with my invention. Fig. 2 is a plan with the cover removed. Fig. 3 is a section on the line 3 3 in Fig. 2. Fig. 4 is a section on the line 4 4 in Fig. 2. Fig. 5 is a side elevation of the meter. Fig. 6 is an under side view of the cover of the meter. Fig. 7 is a perspective view of the guide-ribs and parts in connection therewith. Fig. 8 is a front elevation of the same part drawn to a large scale, and in this figure also a part of the bottom of the measuring-chamber is shown in section. Fig. 9 is a section on the line 9 9 in Fig. 8. Fig. 10 is a section on the line 10 10 in Fig. 8. Fig. 11 is a plan of the piece on which the guide-ribs are formed and shows how it may be adjusted to compensate wear.

$a$ is the lower part of the casing, and $b$ is the cover. They inclose between them the measuring-chamber $c$.

$a'$ is the main inlet-channel, and $a^2$ is the main outlet.

$c^x$ is the passage into the measuring-chamber, and $c^{xx}$ is the passage from it to the main outlet.

$d^x$ and $d^{xx}$ are corresponding hooded ports in the cover.

$e$ is the piston.

$e'$ are rings of steel or other rigid wire embedded in the vulcanite piston.

$e^2$ is a peg upon the piston, which drives the counting-train. The counting-train is not shown.

$f$ is the boss on which the piston works.

$g$ is the stud which holds the boss in place.

$h$ is the support for the abutment.

$h'$ $h'$ are the piston-guides, and $i$ is the abutment-flap.

$i'$ is a regulating-screw, which limits the freedom of the flap. The back of the flap comes against this screw when the flap moves outward or away from the center $e^2$.

In order that the piece on which the guide-ribs $h'$ $h'$ are formed may be capable of adjustment, I provide screws $x$ $x$ at its back, which bear against the case and regulate its position.

In this meter the chamber $c$ is lined with sheet-brass, and the piston has a cross-bar $e^x$ of the same material, and in addition is strengthened by wire embedded in the vulcanite.

A feature in this meter consists in its having passages $l$ and $m$, the one communicating with the main inlet $a'$ and the other with the main outlet $a^2$. These passages serve two purposes: First, they connect the hoods or spaces over the ports $d^x$ and $d^{xx}$ with the inlet and the outlet, respectively, and so place these ports in the same conditions as the corresponding ports $c^x$ and $c^{xx}$ beneath in such manner that the pressures on the top and bottom faces of the piston are balanced, and, second, they admit of additional ports being formed at $l'$ and $m'$ in the side walls of the measuring-chamber, which afford freer passage to the water into and from the measuring-chamber, which in some positions of the piston is needed. In place of jointing the abutment-flap $i$ to the abutment-carrier $h$ it may have a flexible connection, or an abutment pressed inward radially by a spring may be employed.

It is obvious that this meter may, when required, be used for measuring other liquids as well as water.

What I claim is—

1. A water-meter having a measuring-chamber, a main inlet at one side of the measuring-chamber, and an outlet at the opposite side, a cap or cover for the measuring-chamber, an elliptical piston having an elliptical opening, a boss which the elliptical piston surrounds and on which it is free to revolve and move lengthwise, ports connecting the inlet and outlet openings with the interior of the piston, ports leading to the spaces inside the cap or cover, and an abutment-flap $i$, movable about a joint and serving to separate the inlet from the outlet side of the meter, substantially as described.

2. The combination of a measuring-chamber having inlet and outlet openings on opposite sides, a piston within the chamber, having an elliptical opening into which extends a boss around which the piston is free to move and on which it may move lengthwise, a cover or cap above the measuring-chamber, ports leading from the space below the cap to the measuring-chamber and the interior of the piston, ports leading from the bottom of the chamber to the inlet and outlet openings, and an abutment-flap pivoted vertically within the chamber and bearing against the piston and serving to separate the inlet from the outlet side of the meter, substantially as described.

3. In a water-meter having a measuring-chamber, the combination of an elliptical piston adapted to revolve and move lengthwise in the measuring-chamber, a movable abutment which bears against the piston, and an adjustable stop $i'$, for controlling the abutment, substantially as set forth.

4. In a water-meter having a measuring-chamber, the combination of an elliptical piston adapted to revolve and move lengthwise therein, the piston-guides $h'$, adjustable toward and from the piston, and the pivoted abutment-flap, which also bears against the piston, substantially as set forth.

5. In a water-meter having a measuring-chamber with inlet and outlet apertures at both ends, and also lateral inlet and outlet apertures $l'$ $m'$ through the side wall of the measuring-chamber, the combination of the elliptical piston and the abutment mounted in the measuring-chamber between the side openings $l'$ $m'$.

WALTER GEORGE KENT.

Witnesses:
JNO. H. WHITEHEAD,
24 *Southampton Buildings, London.*
T. F. BARNES,
17 *Gracechurch Street, London.*